United States Patent [19]

Tanikawa

[11] Patent Number: 5,572,735
[45] Date of Patent: Nov. 5, 1996

[54] METHOD AND APPARATUS FOR DISCHARGING THE OUTPUT VOLTAGE OF A DC POWER SUPPLY

[75] Inventor: Roy K. Tanikawa, Irvine, Calif.

[73] Assignee: AST Research, Inc., Irvine, Calif.

[21] Appl. No.: 250,596

[22] Filed: May 27, 1994

[51] Int. Cl.$^6$ .................................................. G06F 1/26
[52] U.S. Cl. ........................................... 395/750; 345/211
[58] Field of Search ............................ 395/750; 327/465; 345/87, 211–214; 320/1, 2, 13

[56] References Cited

U.S. PATENT DOCUMENTS

| | | | |
|---|---|---|---|
| 3,956,609 | 5/1976 | Marendaz | 219/69.18 |
| 4,219,872 | 8/1980 | Engelmann | 363/126 |
| 4,748,444 | 5/1988 | Arai | 345/99 |
| 5,182,810 | 1/1993 | Bartling et al. | 395/750 |

OTHER PUBLICATIONS

Data Sheet, Maxim Integrated Products, MAX749, Digitally Adjustable LCD Bias Supply, pp. 4–149 to 4–159, May 1993.

*Primary Examiner*—Jack B. Harvey
*Assistant Examiner*—Xuong M. Chung-Trans
*Attorney, Agent, or Firm*—Knobbe, Martens Olson & Bear

[57] ABSTRACT

A voltage discharge circuit discharges the voltage across a charge storage device, such as a capacitor, at an output of a power supply. The discharge circuit may be used, for example, in a contrast power supply for an LCD panel. The discharge circuit uses one or more switches to control the coupling between the output capacitor and a discharge element, such as a resistor. When the power supply is enabled, the discharge resistor is not coupled to the output capacitor, so that the discharge circuit does not significantly affect the operation of the power supply. When the power supply is disabled, the switches couple the discharge resistor to the output capacitor to discharge any accumulated voltage at a relatively fast rate. For a contrast power supply for an LCD display, a switching power supply is preferred.

3 Claims, 5 Drawing Sheets

METHOD AND APPARATUS FOR DISCHARGING THE OUTPUT VOLTAGE OF A DC POWER SUPPLY

BACKGROUND OF THE INVENTION

1. Field of the Invention

The present invention pertains to the field of DC power supplies. In particular, the present invention pertains to a DC power supply with an output voltage discharge circuit for providing a bias voltage to a liquid crystal display (LCD) panel.

2. Background Information

The present invention relates to a DC power supply with an output voltage discharge circuit. The DC power supply of the present invention may be advantageously used to power an LCD video panel for various electronic devices, such as notebook computers. LCD panels are used in various applications, primarily because they are smaller and consume less energy than a cathode ray tube (CRT) video display. As a result, LCD panels are typically used in portable devices. An LCD panel typically requires four logic and control signals and two power signals for operation. A frame panel clock, a line clock, and a pixel clock control the timing of the LCD panel. A logic signal controls the illumination status at each pixel location on the LCD panel. The LCD panel typically must also be provided with a contrast power signal and a backlight power signal.

LCD panels typically consume substantial amounts of electrical energy. Thus, particularly for battery-powered devices, the LCD panel can be advantageously turned off when not in use to conserve power. An LCD panel can be turned off by removing the logic and control signals, along with the power signals. However, the specifications for several commercial LCD panels indicate that the contrast power signal should be shut off within about 15 milliseconds of the time that the logic and control signals are disabled. Otherwise, the useful life of the LCD panel can be considerably shortened.

It is simple enough to disable the power supply that provides the contrast power signal within 15 milliseconds of the time that the logic and control signals are disabled. However, the voltage at the output of the power supply may remain at too large a value for much longer than 15 milliseconds. Power supplies typically have a capacitor at the output to filter the output voltage. When the power supply is turned on, the output capacitor accumulates a charge. When the power supply is turned off, the output capacitor typically discharges through the LCD panel, which typically takes approximately 90 milliseconds. Thus, the output voltage from the power supply is applied to the input of the LCD panel for a much longer period of time than the specified 15 millisecond maximum time limit.

Some manufacturers have placed a switch, such as a transistor, between the output capacitor of the power supply and the LCD panel. When the contrast power supply is enabled, a control signal closes the switch to allow the power supply to provide contrast power to the LCD panel. When the contrast power supply is disabled, a control signal opens the switch to remove the output voltage from the LCD panel. While this design can remove the output voltage within the specified 15 milliseconds, this design is undesirable for two reasons. First, the placement of the transistor between the power supply and the LCD panel causes a large amount of current to flow through the transistor, which dissipates a considerable amount of electrical energy. Second, a relatively expensive transistor must be chosen to reduce the resistance at this critical point.

SUMMARY OF THE INVENTION

One aspect of the present invention is a contrast power supply in a computer. The computer comprises an LCD panel, a CPU, and a main power supply. The contrast power supply comprises a voltage converter, a charge storage device, and a discharge circuit. The voltage converter is connected to receive power from the main power supply on a first power line. The voltage converter is further connected to receive a contrast enable signal. The contrast enable signal has a first state and a second state. The voltage converter is responsive to the contrast enable signal to generate power on a second power line when the contrast enable signal is in the first state. The charge storage device is connected to receive the power from the voltage converter on the second power line. The charge storage device is further connected to accumulate a charge from the power on the second power line and to drive the LCD panel with the voltage from the accumulated charge. The discharge circuit is coupled to the charge storage device. The discharge circuit is responsive to the contrast enable signal being in the second state to discharge the charge accumulated at the charge storage device within a time period that substantially avoids damage to the LCD panel.

Another aspect of the present invention is a discharge circuit for a power supply. The power supply has an enabled mode and a disabled mode. The power supply is connected to receive a control signal to select between the enabled mode and the disabled mode. The power supply comprises a charge storage device. The charge storage device accumulates a charge during the enabled mode to provide a power supply output voltage. The discharge circuit comprises a discharge element and a switch. The switch is connected to couple the charge storage device with the discharge element during the disabled mode to discharge the accumulated charge. The switch is further connected to decouple the charge storage device from the discharge element during the enabled mode.

Another aspect of the present invention is a power supply. The power supply has an enabled mode and a disabled mode. The power supply is connected to receive a control signal. The control signal selects between the enabled mode and the disabled mode. The power supply comprises a switching voltage regulator, a charge storage device, and a discharge circuit. The switching voltage regulator is configured to generate power on a power line. The charge storage device is connected to receive the power from the power line and to accumulate a charge during the enabled mode to provide a power supply output voltage. The discharge circuit is coupled to the charge storage device. The discharge circuit is responsive to the control signal to discharge the accumulated charge during the disabled mode.

Another aspect of the present invention is a power supply. The power supply has an enabled mode and a disabled mode. The power supply is connected to receive a control signal. The control signal selects between the enabled mode and the disabled mode. The power supply comprises a voltage converter, a charge storage device, and a discharge circuit. The voltage converter is configured to generate power on a power line. The charge storage device is connected to receive the power on the power line and to accumulate a charge during the enabled mode to provide a power supply output voltage. The discharge circuit comprises means for discharging the accumulated charge at the charge storage device when the discharge means is coupled to the charge storage device and means for coupling the discharge means to the charge storage device. The coupling means is responsive to the control signal to couple the discharge means to the charge storage device during the disabled mode.

DETAILED DESCRIPTION OF THE PREFERRED EMBODIMENT

Figure 1:
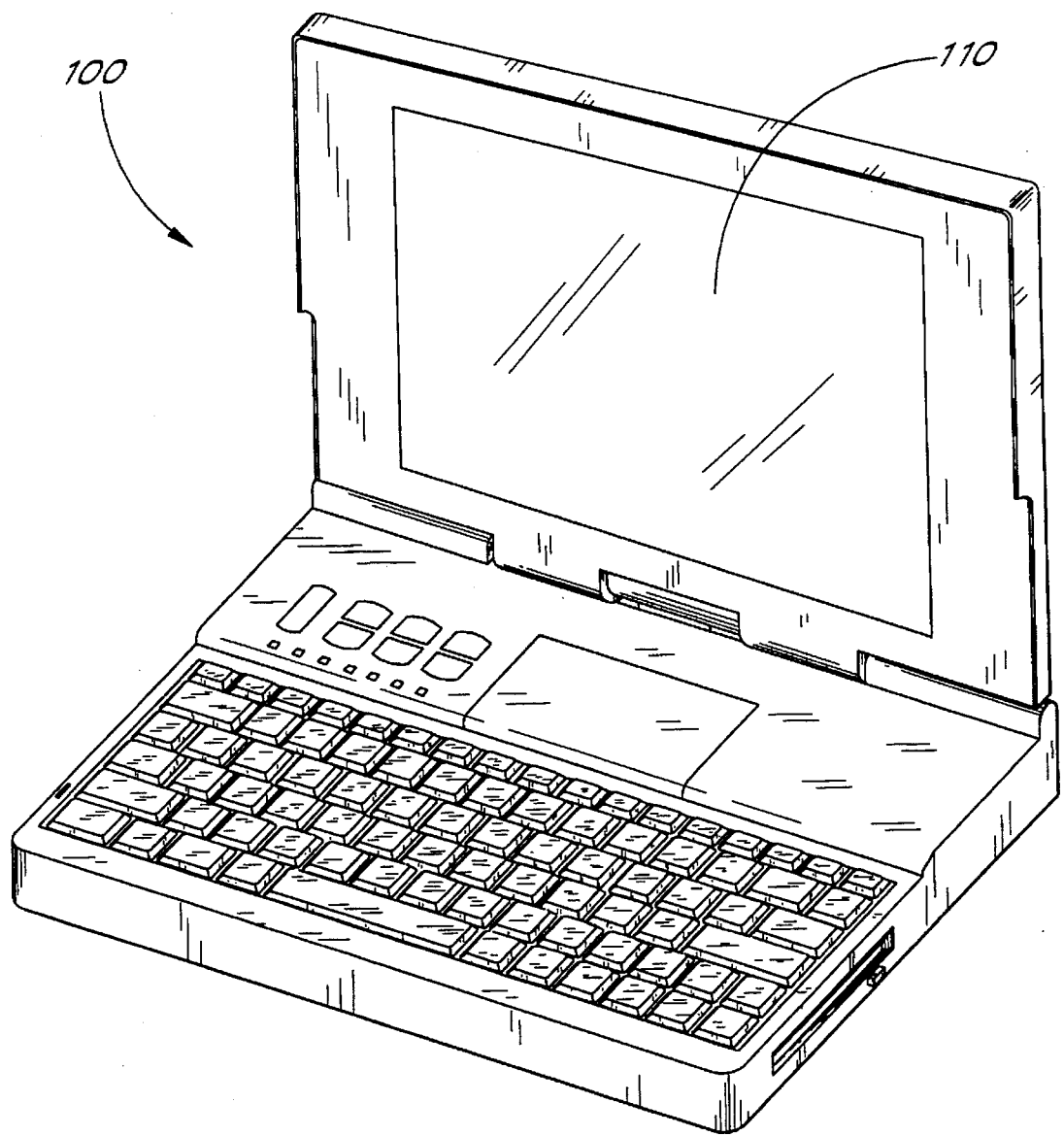
FIG. 1 is a perspective view of a notebook computer that is used to illustrate the preferred embodiment of the discharging power supply of the present invention.

FIG. 1 is a perspective view of a notebook computer 100 that is used to illustrate the discharging power supply of the present invention. The notebook computer 100 comprises an LCD panel 110.

Figure 2:
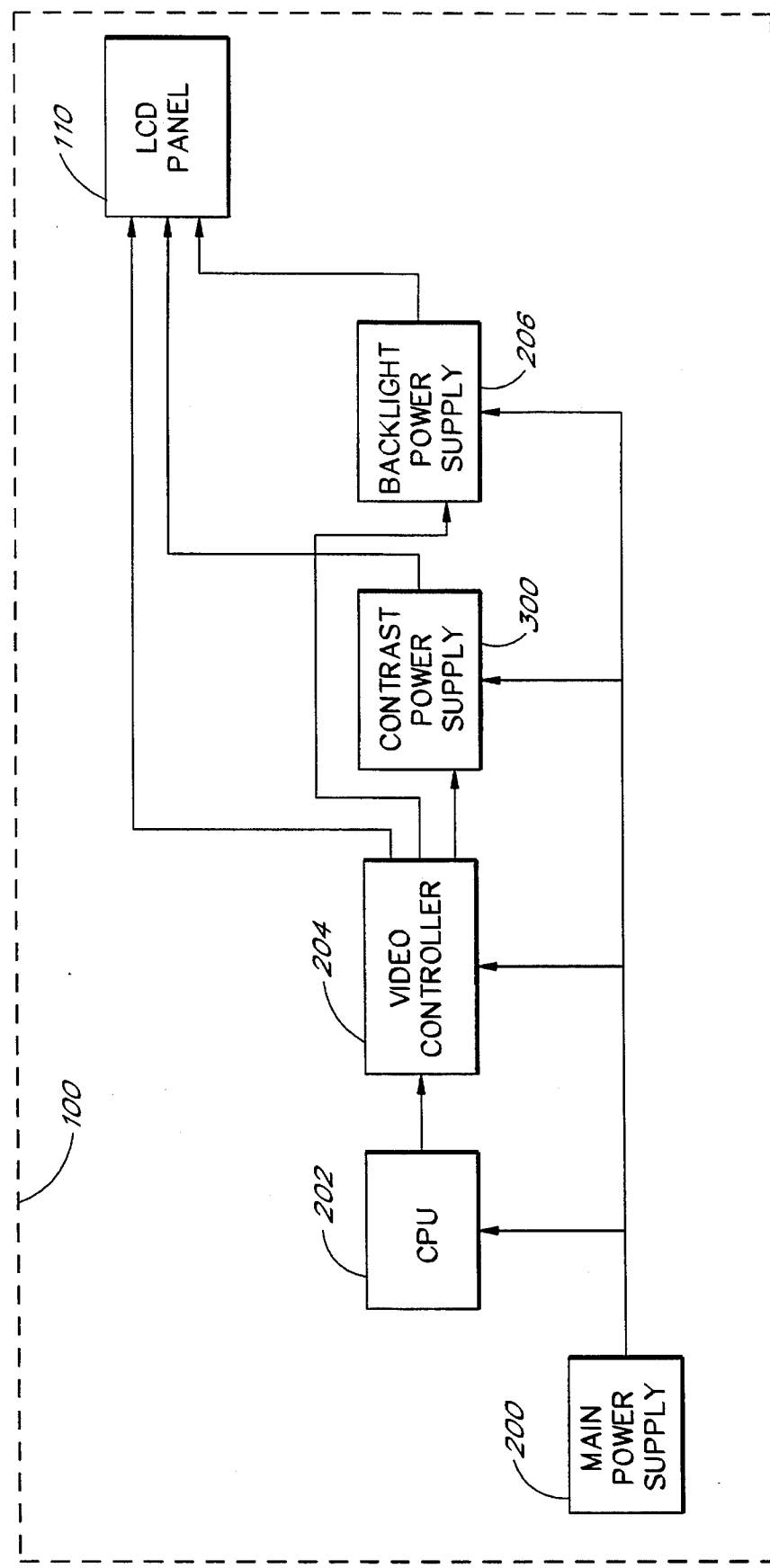
FIG. 2 is a functional block diagram illustrating selected units of the notebook computer of FIG. 1.

FIG. 2 is a functional block diagram illustrating selected units of the notebook computer 100. FIG. 2 illustrates all of the functions of the notebook computer 100 that are necessary to understand the discharging power supply of the present invention.

As shown in FIG. 2, the notebook computer 100 comprises the LCD panel 110, a main power supply 200, a CPU 202, a video controller 204, a backlight power supply 206 and a contrast power supply 300. The main power supply 200 provides various DC voltages for use by the CPU 202, the video controller 204, the contrast power supply 300, and the backlight power supply 206. The CPU 202 provides various control signals to the video controller 204 to control its operation. The video controller 204, in turn, provides various control signals to the contrast power supply 300 and the backlight power supply 206 to control their operation. The video controller 204 also provides several data and control signals to the LCD panel 110. Specifically, the video controller 204 provides a logic signal indicating which pixel locations should be turned on, along with a frame panel clock, a line clock, and a pixel clock, as is well known in the art. The contrast power supply 300 provides contrast power to the LCD panel 110. The backlight power supply 206 provides backlight power to the LCD panel 110. The LCD panel 110 may be any of a number of different LCD panels manufactured by various companies. For example, the LCD panel 110 may comprise a model LM64K101 monochrome LCD panel manufactured by Sharp. The general operation of the LCD panel 110 is well known to a person of skill in the art. An operator's manual for a specific LCD panel 110 can be referenced for more specific information.

Figure 3:
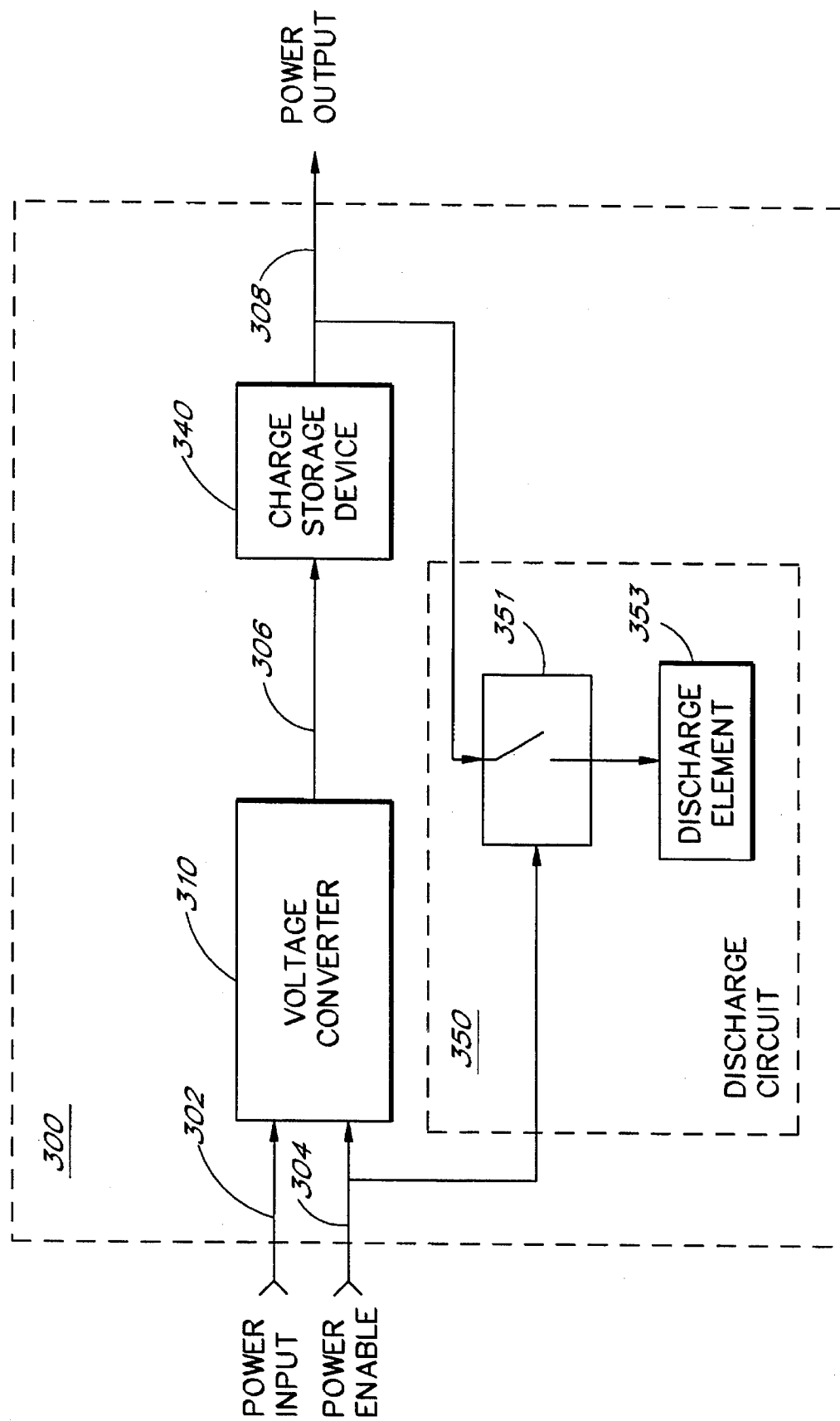
FIG. 3 is a functional block diagram of a contrast power supply of the notebook computer of FIG. 1, implementing the discharging power supply of the present invention.

FIG. 3 is a functional block diagram of a preferred embodiment of the contrast power supply 300 of FIG. 2. The contrast power supply 300 comprises a voltage converter 310, a charge storage device 340, and a discharge circuit 350. The discharge circuit 350 comprises a switch 351 and a discharge element 353. The voltage converter 310 receives power from the main power supply 200 on the power input line 302. The voltage converter 310 also receives a control signal from the video controller 204 on the power enable line 304. The discharge circuit 350 also receives the signal on the power enable line 304. The voltage converter 310 is connected to the charge storage device 340 by a power line 306. The charge storage device 340 provides power to the LCD panel 110 over the power output line 308. The power output line 308 is also connected to the discharge circuit 350. The power enable line 304 is connected to the switch 351 inside the discharge circuit 350. Also, the power output 308 is connected to the switch 351 inside the discharge circuit 350. The switch 351 is also connected to the discharge element 353.

Generally, the voltage converter 310 receives a first DC voltage from the main power supply 200 on the power input line 302. This first DC voltage may, for example, be a positive five-volt DC signal. The voltage converter 310 also receives a digital control signal from the video controller 204 on the power enable line 304. When the signal on the power enable line 304 is active, the voltage converter 310 uses the power signal on the power input line 302 to generate a second power signal on the power line 306. The signal on the power line 306 is typically not a strictly DC voltage, as the voltage converter 310 preferably implements a switching power supply. The power signal on the power line 306 may, for example, have an average voltage of approximately minus 15 volts. The voltage at the power line 306 is generally determined by the requirements of the LCD panel 110. The charge storage device 340 converts the power signal on the power line 306 into a substantially DC voltage, as is typically required for operation of the LCD panel 110. The charge storage device 340 supplies this DC voltage to the LCD panel 110 over the power output line 308.

The switch 351 inside the discharge circuit 350 also receives the digital control signal from the video controller 204 on the power enable line 304. When the signal on the power enable line 304 is active, the switch 351 is open. Thus, the signal on the power output line 308 is not connected to the discharge element 353 of the discharge circuit 350. When the contrast power supply 300 is enabled by the signal on the power enable line 304, the discharge circuit 350 has substantially no effect on the overall operation of the contrast power supply 300. Specifically, the discharge circuit 350 draws substantially zero current from the signal on the power output line 308.

When the control signal on the power enable line 304 becomes inactive, the voltage converter 310 stops driving the signal on the power line 306. However, the charge storage device 340 remains charged to a minus 15-volt level. The inactive level of the signal on the power enable line 304 also causes the switch 351 to close. When the switch is closed, there is a low impedance connection between the power output line 308 and the discharge element 353. The discharge element 353 provides an effective current sink to discharge the voltage accumulated across the charge storage device 340. Thus, when the contrast power supply 300 is disabled, the discharge circuit 350 discharges the voltage across the charge storage device 340 quickly enough to avoid damage to the LCD panel 110. Preferably, the discharge of the accumulated voltage takes approximately 15 milliseconds, or less.

Figure 4:
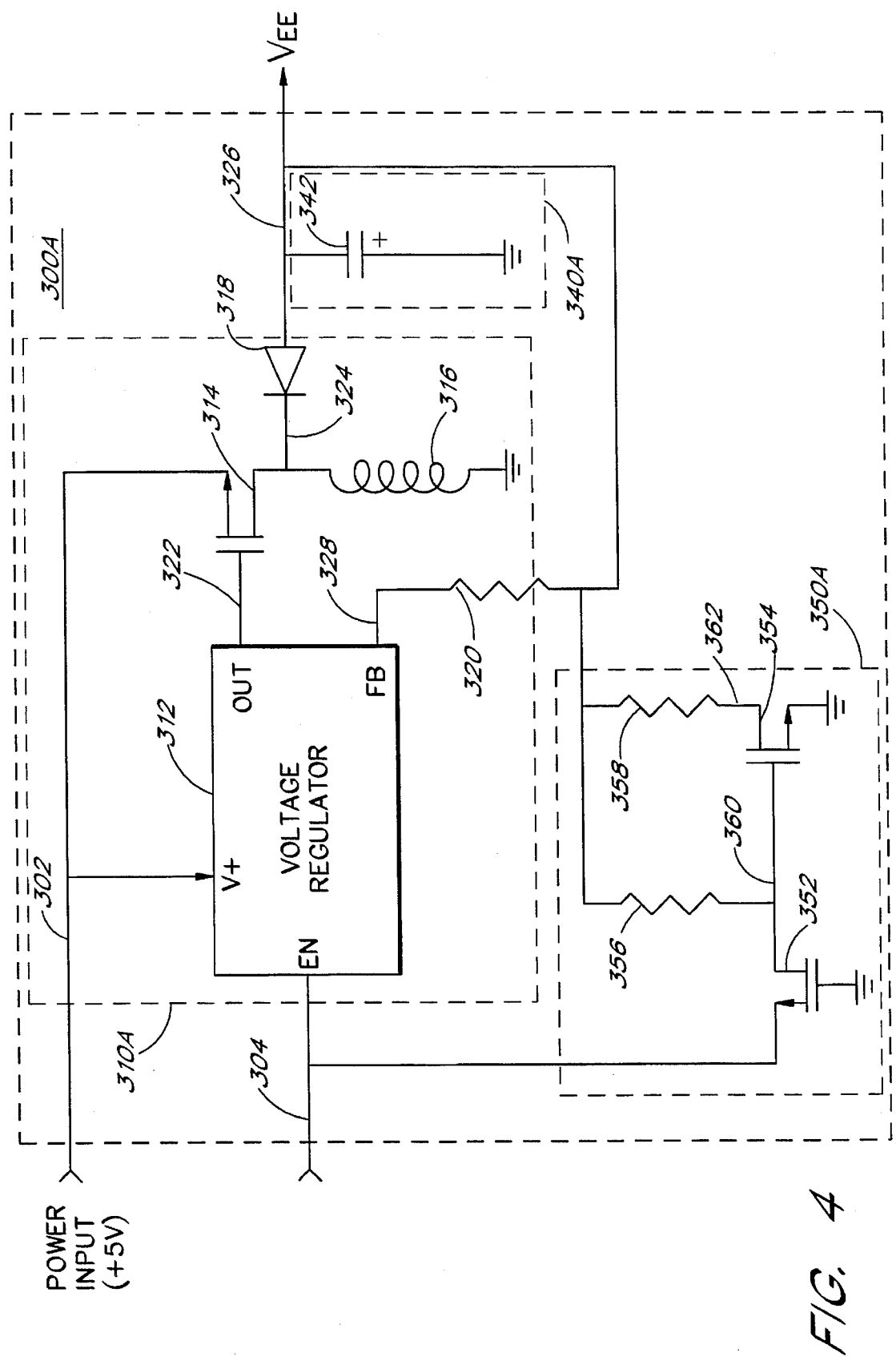
FIG. 4 is a schematic diagram of the preferred embodiment of the contrast power supply of FIG. 3.

FIG. 4 is a schematic diagram of a preferred embodiment contrast power supply 300A. The contrast power supply 300A is a specific and preferred embodiment of the more general contrast power supply 300 of FIGS. 2 and 3. The contrast power supply 300A comprises a voltage converter 310A, a charge storage device 340A, and a discharge circuit 350A. The voltage converter 310A comprises a voltage regulator IC 312, a switching metal oxide semiconductor field effect transistor (MOSFET) 314, an inductor 316, a diode 318, and a feedback resistor 320. The charge storage device 340A comprises a storage capacitor 342. The discharge circuit 350A comprises a control MOSFET 352, a discharge MOSFET 354, a biasing resistor 356, and a discharge resistor 358.

The voltage regulator IC 312 preferably comprises a MAX749 Digitally Adjustable LCD Bias Supply, as sold by Maxim Integrated Products. The switching MOSFET 314 preferably comprises a model number SI9435DY MOSFET manufactured by Silconix. The inductor 316 preferably comprises a 47 microhenry inductor. The diode 318 preferably comprises a model number 1N5819 diode. The value of the feedback resistor 320 depends on the contrast voltage level required to drive the LCD panel 110. For a minus 15-volt contrast power level, the feedback resistor 320 preferably comprises a 1.2 megaohm resistor. The storage capacitor 342 preferably comprises a 22 microfarad capacitor. The control MOSFET 352 and the discharge MOSFET 354 preferably comprise model number TP0610 MOSFETs manufactured by Silconix. The biasing resistor 356 preferably comprises a 100 kiloohm resistor. The discharge resistor 358 preferably comprises a 500 ohm resistor. Various other components can also be used in the contrast power supply 300A.

The voltage regulator IC 312 receives a power signal on the power input line 302 at a V+ input. The power signal at the V+ input of the voltage regulator IC 312 provides power for the operation of the voltage regulator IC 312. The voltage regulator IC 312 also receives a control signal on the power enable line 304 at an enable input. The enable input is referred to as a CTRL input in the Maxim data sheets. An output of the voltage regulator IC 312 is connected to a gate of the switching MOSFET 314 by a PWM line 322. In the Maxim device of the preferred embodiment, a pair of output pins are tied together to form the present output. The power input line 302 is also connected to a source of the switching MOSFET 314. A drain of the switching MOSFET 314 is connected to a first terminal of the inductor 316 and to a cathode of the diode 318 by an inductor line 324. A second terminal of the inductor 316 is connected to the system ground. An anode of the diode 318 is connected to a negative terminal of the storage capacitor 342 by a contrast power line 326.

The contrast power line 326 provides a contrast power or bias voltage to the LCD panel 110. The contrast power line 326 is also connected to a first terminal of the feedback resistor 320, to a first terminal of the biasing resistor 356, and to a first terminal of the discharge resistor 358. A second terminal of the feedback resistor 320 is connected to a feedback input of the voltage regulator IC 312 by a feedback line 328. A second terminal of the discharge resistor 358 is connected to a drain of the discharge MOSFET 354 by a discharge line 362. A second terminal of the biasing resistor 356 is connected to a gate of the discharge MOSFET 354 and to a drain of the control MOSFET 352 by a discharge control line 360. A source of the discharge MOSFET 354 is connected to the system ground. A gate of the control MOSFET 352 is also connected to the system ground. A source of the control MOSFET 352 is connected to the power enable line 304.

The voltage converter 310A and the storage capacitor 342 comprise an inverting switching power supply. The preferred embodiment comprises a switching power supply because switching power supplies typically have relatively high efficiency. The high efficiency helps to conserve battery power.

The voltage regulator IC 312 is responsive to the control signal on the power enable line 304. The control signal on the power enable line 304 is represented as $V_{304}$ in FIG. 5. When the signal on the power enable line 304 is active at a logic one, the voltage regulator IC 312 generates a pulse width modulation signal on the PWM line 322. When the pulse width modulation signal on the PWM line 322 is at a logic one, the switching MOSFET 314 conducts electrical power from the power input line 302 to the inductor line 324. When the pulse width modulation signal on the PWM line 322 is at a logic zero, the switching MOSFET 314 does not conduct the electrical power from the power input line 302 to the inductor line 324.

When the switching MOSFET 314 is conducting, the inductor 316 stores energy from the power input line 302. The diode 318 is reverse biased, so that current does not flow from the inductor line 324 to the contrast power line 326. When the switching MOSFET 314 is not conducting, the inductor 316 releases stored energy. As the current flowing through the inductor 316 cannot change instantaneously, the inductor 316 generates a negative voltage at the inductor line 324 to induce a current that is substantially the same as the current that was flowing through the switching MOSFET 314 when the switching MOSFET 314 was conducting. The negative voltage at the inductor line 324 forward biases the diode 318 so that current flows from the storage capacitor 342 and from the LCD panel 110 into the inductor 316. The current flow from the storage capacitor 342 causes a negative charge to accumulate across the storage capacitor 342. Thus, the voltage at the contrast power line 326 becomes negative.

When the switching MOSFET 314 conducts again, the diode 318 is again reverse biased. Current again flows from the power input line 302 into the inductor 316 to again store energy in the inductor 316. The negative charge stored across the storage capacitor 342 draws current from the LCD panel 110. The storage capacitor 342 maintains the negative voltage at the contrast power line 326 when energy is being stored into the inductor 316, while the inductor 316 maintains the negative voltage when the inductor 316 is releasing energy.

The voltage regulator IC 312 adjusts the pulse width of the modulated signal on the PWM line 322 to maintain a specified current at the feedback input of the voltage regulator IC 312. The value of the feedback resistor 320 is selected to achieve the specified current at the feedback input when the voltage level at the contrast power line 326 is at the desired level. Thus, the feedback resistor 320 determines the output voltage that is generated by the contrast power supply 300A. The signal at the contrast power line 326 is represented as $V_{326}$ in FIG. 5. The voltage at the contrast power line 326 changes exponentially from zero volts to minus fifteen volts in the preferred embodiment.

When the control signal on the power enable line 304 is active at a logic one, the control MOSFET 352 is turned on by the negative gate to source voltage of the control MOSFET 352. In the preferred embodiment, a 5-volt signal represents a logic one. The control signal on the power enable line 304 must have a large enough magnitude to obtain a gate-to-source voltage that exceeds the threshold voltage of the control MOSFET 352. When the control MOSFET 352 is turned on by a five-volt signal on the power enable line 304, the voltage at the discharge control line 360 also becomes five volts. The signal on the discharge control line 360 is represented as $V_{360}$ in FIG. 5. The positive gate to source voltage across the discharge MOSFET 354 turns the discharge MOSFET 354 off. Thus, substantially no current flows through the discharge resistor 358. The signal on the discharge line 362 is represented as $V_{362}$ in FIG. 5.

The signal on the discharge line 362 is substantially the same as the signal on the contrast power line 326 when the signal on the power enable line 304 is active, because there is substantially no voltage drop across the discharge resistor 358. A small current flows through the biasing resistor 356, as the voltage between the contrast power line 326 and the discharge control line 360 is approximately 20 volts in the preferred embodiment. The value of the biasing resistor 356 is preferably relatively large to minimize the power consumption of the discharge circuit 350A while the contrast power supply 300A is enabled.

When the signal on the power enable line 304 toggles to zero volts to become inactive, the voltage regulator IC 312 disables the pulse width modulation signal on the PWM line 322 to turn off the switching MOSFET 314. The diode 318 becomes reverse biased so that the charge from the storage capacitor 342 cannot discharge through the diode 318. Although the inductor 316 is no longer supplying power to the storage capacitor 342, the storage capacitor 342 is still charged to a minus 15 volts, in the preferred embodiment.

Figure 5:
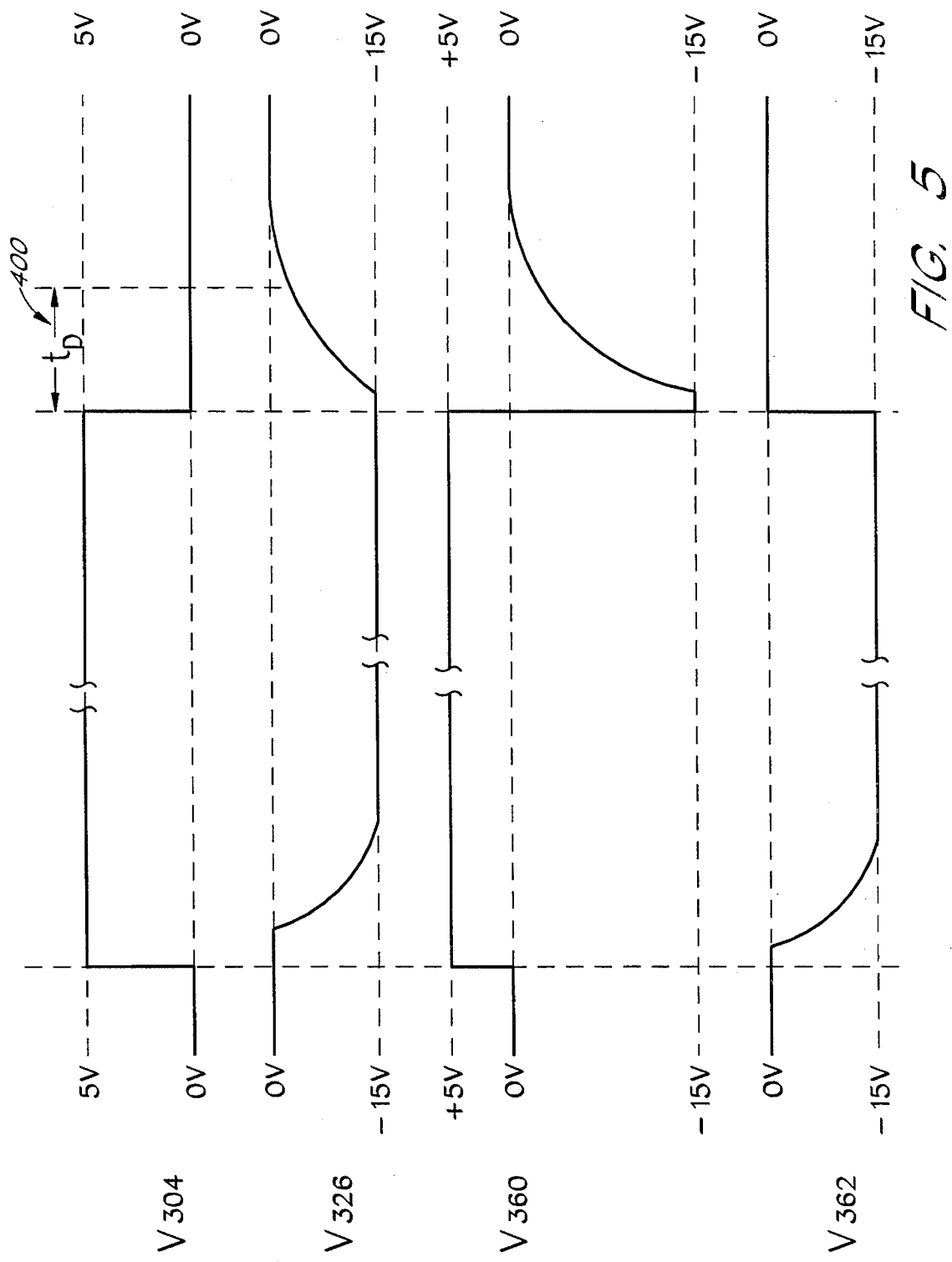
FIG. 5 is a timing diagram of several signals of the contrast power supply of FIG. 4.

Referring to FIGS. 4 and 5, when the signal on the power enable line 304 becomes inactive, the control MOSFET 352 is turned off because there is substantially no voltage differential between the gate and the source. The biasing resistor 356 pulls the signal on the discharge control line 360 down to the minus 15 volts of the contrast power line 326. The negative gate to source voltage at the discharge MOSFET 352 turns on the discharge MOSFET 354, which pulls the voltage on the discharge line 362 to ground. The minus 15 volts at the contrast power line 326 is now connected directly across the discharge resistor 358. The discharge resistor 358 preferably has a relatively small value to increase the discharge speed of the storage capacitor 342. The negative voltage across the storage capacitor 342 discharges through the discharge resistor 358 until the voltage at the discharge control line 360 reaches the threshold voltage of the discharge MOSFET 354. At this point, the discharge MOSFET 354 turns off, and the storage capacitor 342 no longer discharges through the discharge resistor 358. The threshold voltage of the discharge MOSFET 354 is preferably between 1.5 and 3.5 volts. The remaining voltage across the storage capacitor 342 discharges through the LCD panel 110. However, the voltage across the storage capacitor 342 is now small enough to avoid any damage to the LCD panel 110. The time required to discharge the voltage at the contrast power line 326 from minus 15 volts to approximately minus 4 volts is defined as a discharge time ($t_D$) 400, as illustrated in FIG. 5. A voltage of approximately minus 4 volts preferably does not cause substantial damage to the LCD panel 110. In the preferred embodiment, the discharge circuit 350A achieves a discharge time 400 of approximately 15 milliseconds, or less. In contrast, the voltage across the storage capacitor 342 would take approximately 90 milliseconds to discharge, if the only discharge path were through the LCD panel 110.

A user of the notebook computer 100 does not have to do anything special to utilize the discharging contrast power supply 300 of the present invention. During normal operation of the notebook computer 100, the discharge circuit 350 preferably has a minimal effect on the operation of the notebook computer 100 when the LCD panel 110 is enabled. The discharge circuit 350 quickly discharges the output voltage of the contrast power supply 300 when the LCD panel 110 is disabled.

Although described above in connection with particular embodiments of the present invention, it should be understood that the descriptions of the embodiments are illustrative of the invention and are not intended to be limiting. Various modifications and applications may occur to those skilled in the art without departing from the true spirit and scope of the invention as defined in the appended claims.

What is claimed is:

1. A contrast power supply in a computer, said computer comprising an LCD panel, a CPU, and a main power supply, said contrast power supply comprising:

a voltage converter, said voltage converter connected to receive power from said main power supply on a first power line, said power on said first power line comprising a direct current voltage, said voltage converter further connected to receive a contrast enable signal, said contrast enable signal having a first state and a second state, said voltage converter responsive to said contrast enable signal to generate power on a second power line when said contrast enable signal is in said first state, wherein said voltage converter comprises a switching voltage regulator;

a charge storage device, said charge storage device connected to receive said power from said voltage converter on said second power line, said charge storage device further connected to accumulate a charge from said power on said second power line and to drive said LCD panel with the voltage from said accumulated charge, said charge storage device comprising a capacitor; and a discharge circuit, said discharge circuit coupled to said charge storage device, said discharge circuit responsive to said contrast enable signal being in said second state to discharge the charge accumulated at said charge storage device within a time period that substantially avoids damage to said LCD panel while said LCD panel remains connected to said charge storage device, wherein said discharge circuit comprises:

a resistor; and
a switch, said switch responsive to said contrast enable signal, said switch configured to allow said charge storage device to discharge an accumulated charge through said resistor when said contrast enable signal is in said second state, said switch further configured to substantially prevent said charge storage device from discharging through said resistor when said contrast enable signal is in said first state, wherein said switch comprises at least one MOSFET, wherein said switching regulator comprises:
a voltage regulator circuit, said voltage regulator circuit configured to generate a pulse width modulated signal, said pulse width modulated signal having a first state and a second state;
an inductor; and
a transistor, said transistor connected to receive said power on said first power line, said transistor further connected to receive said pulse width modulated signal from said voltage regulator circuit, said transistor responsive to said pulse width modulated signal to couple said power on said first power line to said inductor when said pulse width modulated signal is in said first state and to substantially isolate said power on said first power line from said inductor when said pulse width modulated signal is in said second state, said inductor configured to store energy when said inductor is coupled to said power on said first power line and to release energy when said inductor is isolated from said power on said first power line, said capacitor connected to receive said energy released by said inductor to accumulate said charge, said voltage regulator circuit responsive to said accumulated charge to adjust the pulse width of said pulse width modulated signal to generate a predetermined output voltage.

2. The contrast power supply of claim 1, wherein said voltage regulator circuit comprises a voltage regulator integrated circuit component.

3. A power supply, said power supply having an enabled mode and a disabled mode, said power supply connected to receive a control signal, said control signal selecting between said enabled mode and said disabled mode, said power supply comprising:

- a voltage converter, said voltage converter configured to generate power on a power line, said voltage converter comprising a switching voltage regulator;
- a charge storage device, said charge storage device connected to receive said power on said power line and to accumulate a charge during said enabled mode to provide a power supply output voltage; and
- a discharge circuit, said discharge circuit comprising:
  - a discharge device that discharges said accumulated charge at said charge storage device when said discharge device is coupled to said charge storage device: and
  - a coupling device that couples said discharge device to said charge storage device, said coupling device responsive to said control signal to couple said discharge device to said charge storage device during said disabled mode, wherein said switching voltage regulator comprises:
- a pulse width modulated signal generator, said pulse width modulated signal having a first state and a second state; an inductor; and
- a switch that selectively conducts energy to said inductor, said switch responsive to said pulse width modulated signal to conduct energy when said pulse width modulated signal is in said first state, said inductor configured to store energy when said pulse width modulated signal is in said first state and to release energy when said pulse width modulated signal is in said second state, said charge storage device connected to receive said energy released by said inductor to accumulate a charge, said pulse width modulated signal generator responsive to said accumulated charge to adjust the pulse width of said pulse width modulated signal to generate a predetermined output voltage.

* * * * *